United States Patent
Abadeer et al.

(10) Patent No.: US 7,375,339 B2
(45) Date of Patent: May 20, 2008

(54) MONITORING IONIZING RADIATION IN SILICON-ON INSULATOR INTEGRATED CIRCUITS

(75) Inventors: Wagdi William Abadeer, Jericho, VT (US); Ethan Harrison Cannon, Essex Junction, VT (US); Dennis Thomas Cox, Rochester, MN (US); William Robert Tonti, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 11/380,736

(22) Filed: Apr. 28, 2006

(65) Prior Publication Data

US 2007/0252088 A1 Nov. 1, 2007

(51) Int. Cl.
*G01T 1/02* (2006.01)
(52) U.S. Cl. .............................. 250/370.07; 250/370.14
(58) Field of Classification Search ........... 250/370.07, 250/370.14
See application file for complete search history.

(56) References Cited

U.S. PATENT DOCUMENTS

| | | | |
|---|---|---|---|
| 3,893,157 A | 7/1975 | Silzars et al. | |
| 4,389,570 A | 6/1983 | Goldstein | |
| 4,634,968 A | 1/1987 | Aslan | |
| 4,788,432 A | 11/1988 | Patel | |
| 4,954,716 A | 9/1990 | Wheeler | |
| 4,963,747 A | 10/1990 | Thacker | |
| 6,259,099 B1 * | 7/2001 | Foulon et al. | 250/370.14 |
| 6,498,372 B2 | 12/2002 | Brown et al. | |
| 2005/0012045 A1 * | 1/2005 | Fifield et al. | 250/370.02 |

* cited by examiner

*Primary Examiner*—Constantine Hannaher
(74) *Attorney, Agent, or Firm*—Schmeiser, Olsen & Watts; Michael J. LeStrange

(57) ABSTRACT

A method, device and system for monitoring ionizing radiation. The method including: collecting an ionizing radiation induced charge collected by the depletion region of a diode formed in a silicon layer below an oxide layer buried below a surface of a silicon substrate; and coupling a cathode of the diode to a precharged node of a clocked logic circuit such that the ionizing radiation induced charge collected by a depletion region of the diode will discharge the precharged node and change an output state of the clocked logic circuit.

5 Claims, 10 Drawing Sheets

MONITORING IONIZING RADIATION IN SILICON-ON INSULATOR INTEGRATED CIRCUITS

FIELD OF THE INVENTION

The present invention relates to the field of integrated circuits; more specifically, it relates to ionizing radiation monitoring of integrated circuits fabricated on silicon-on-insulator substrates.

BACKGROUND OF THE INVENTION

The functioning of various integrated circuit devices, such as n-channel field effect transistors (NFETs) and p-channel field effect transistors (PFETs) may be disrupted when the device is struck by ionizing radiation. Disruption of individual devices can lead to failure of the integrated circuit containing the devices. Devices built in silicon-on-insulator (SOI) substrates are particularly sensitive because charge generated by ionizing radiation is difficult to dissipate. Therefore, there is a need to monitor ionizing radiation events in integrated circuits fabricated on SOI substrates.

SUMMARY OF THE INVENTION

A first aspect of the present invention is a method of monitoring ionizing radiation, comprising: collecting an ionizing radiation induced charge collected by a depletion region of a diode formed in a silicon layer below an oxide layer buried below a surface of a silicon substrate; and coupling a cathode of the diode to a precharged node of a clocked logic circuit such that the ionizing radiation induced charge collected by the depletion region of the diode will discharge the precharged node and change an output state of the clocked logic circuit.

A second aspect of the present invention is an ionizing radiation monitoring device, comprising: a diode formed in a silicon layer below an oxide layer buried below a surface of a silicon substrate; and a cathode of the diode coupled to a precharged node of a clocked logic circuit, an output state of the clocked logic circuit responsive to a change in state of the precharged node, a state of the precharged node responsive to ionizing radiation induced charge collected by a depletion region of the diode and collected in the cathode.

A third aspect of the present invention is a system for monitoring ionizing radiation, comprising: two or more ionizing radiation monitoring devices, each device comprising: a diode formed in a silicon layer below an oxide layer buried below a surface of a silicon substrate; and a cathode of the diode coupled to a precharged node of a clocked logic circuit, an output state of the clocked logic circuit responsive to a change in state of the precharged node, a state of the precharged node responsive to ionizing radiation induced charge collected by a depletion region of the diode and collected in the cathode; and wherein each diode of the two or more ionizing radiation monitoring devices has a cathode of a different area and wherein, other than the diode, each clocked logic circuit is identically designed; a sampling circuit or a combination of a sampling circuit, a microprocessor and a software program for counting a number of changes of state of the output state; and a monitoring circuit or a combination of a monitoring circuit, a microprocessor and a software program for determining which of the clocked logic circuits that has had a change in the output state has a largest area diode.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

A domino logic circuit is defined as a clocked (or dynamic) logic circuit including a latch that has a prechargeable node. An ionizing radiation is defined as radiation that will generate hole-electron pairs in N or P type doped silicon. Examples of ionizing radiation include but are not limited to protons, alpha particles, gamma rays, X-rays and cosmic rays.

Figure 1A:
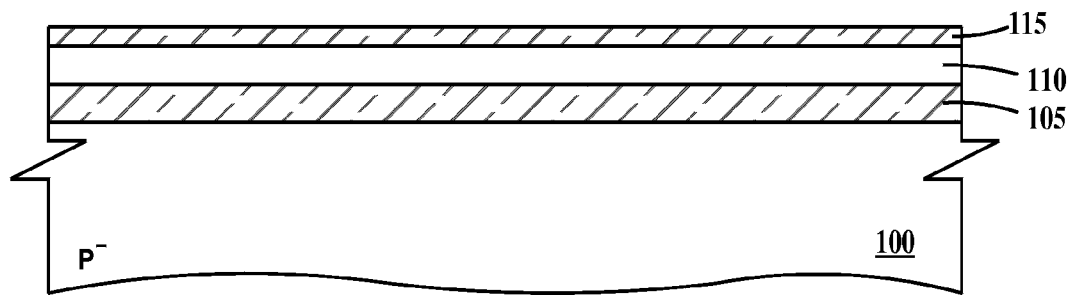
FIGS. 1A through 1G are cross-sectional drawings illustrating fabrication of an ionizing radiation detection device according to embodiments of the present invention.

FIGS. 1A through 1G are cross-sectional drawings illustrating fabrication of an ionizing radiation detection device according to embodiments of the present invention. In FIG. 1A a SOI substrate includes a silicon substrate 100, a buried oxide layer (BOX) 105 on top of silicon substrate 100 and a single-crystal silicon layer 110 on top of BOX 105. A pad oxide layer 115 is formed on top of single-crystal silicon layer 110. In one example, silicon substrate 100 is doped P-type between about $5E15$ atm/cm$^3$ and about $5E16$ atm/cm$^3$.

Figure 1B:
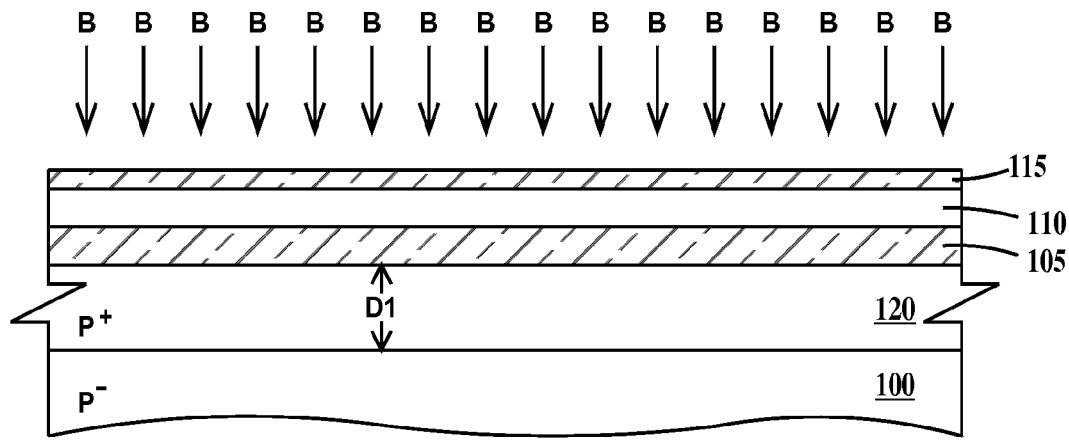

In FIG. 1B a P-type ion-implantation is performed to form doped layer 120. Doped layer 120 extends from BOX 105 into bulk silicon substrate 100 a distance D1. In one example, doped layer 120 is doped P-type between about $5E16$ atm/cm$^3$ and about $5E17$ atm/cm$^3$. (Doped layer 120 has an Na between about $5E16$ and about $5E17$, where Na is the concentration of acceptor dopant in atm/cm$^3$). In one example, D1 is about 1 micron.

Figure 1C:
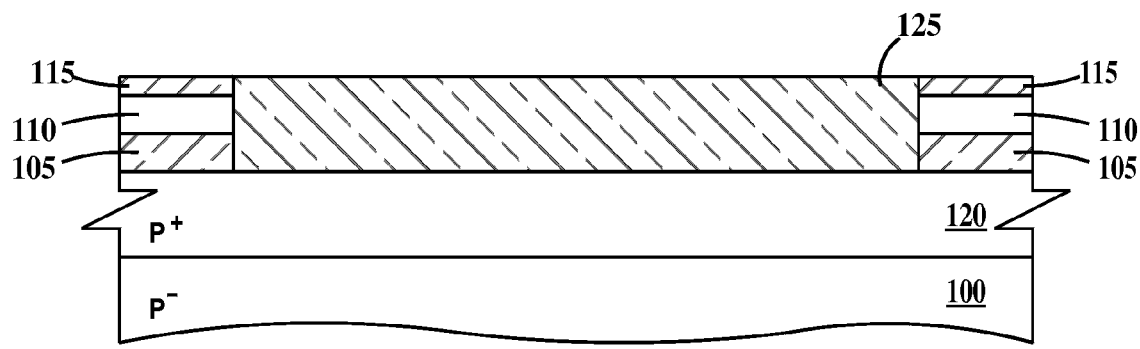

In FIG. 1C, regions of trench isolation 125 are formed through pad oxide layer 115, single-crystal layer 110 and BOX 105. A top surface of trench isolation 125 is coplanar with a top surface of pad oxide layer 115. A bottom surface of trench isolation is in physical contract with doped layer 120. Alternatively, trench isolation 125 may extend into, but not through, doped layer 120. In one example, trench isolation 125 may be formed by forming a patterned photoresist layer on top of pad oxide layer 115, etching (e.g. with a reactive ion etch (RIE) process) away regions of the pad oxide layer not protected by the photoresist layer, removing the photoresist layer and using the patterned pad oxide layer as a hard mask for etching (e.g. using an RIE process) through single crystal silicon layer 110 and BOX 105. Then, an oxide is deposited to overfill the trenches and a chemical-mechanical-polish (CMP) process performed to co-planarize the deposited oxide and patterned pad oxide.

Figure 1D:
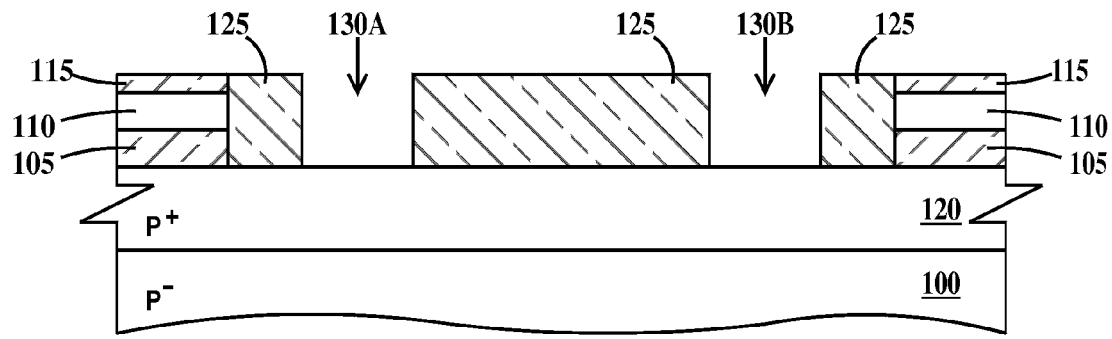

In FIG. 1D, trenches 130A and 130B are formed in trench isolation 125, exposing doped layer 120 in the bottom of the trenches. Trenches 130A and 130B may extend into, but not through doped layer 120.

Figure 1E:
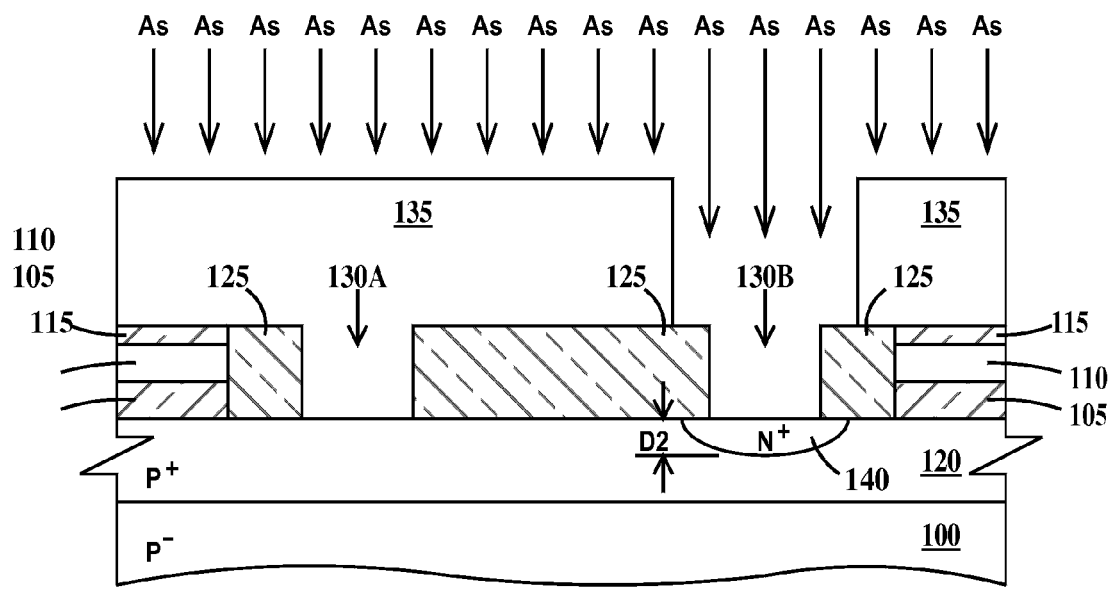

In FIG. 1E a patterned photoresist layer 135 is formed, protecting trench 130A and exposing trench 130B. Then an N-type ion implantation is performed to form a cathode region 140 in doped layer 120. Afterwards, patterned photoresist layer 135 is removed. Cathode region 140 extends a distance D2 into doped layer 120. Cathode region 140 does not extend through doped layer 120 into silicon substrate 100. In one example, the N-type ion implantation implants an arsenic (As) species to a concentration between about 5E19 atm/cm$^3$ and about 5E20 atm/cm$^3$. (Cathode region 140 has an Nd between about 5E19 and about 5E20, where Nd is the concentration of donor dopant in atm/cm$^3$). In one example, D2 is between about 0.2 microns and about 0.5 microns. (A metallurgical junction depth Xm of between about 0.2 microns and about 0.5 microns.)

Figure 1F:
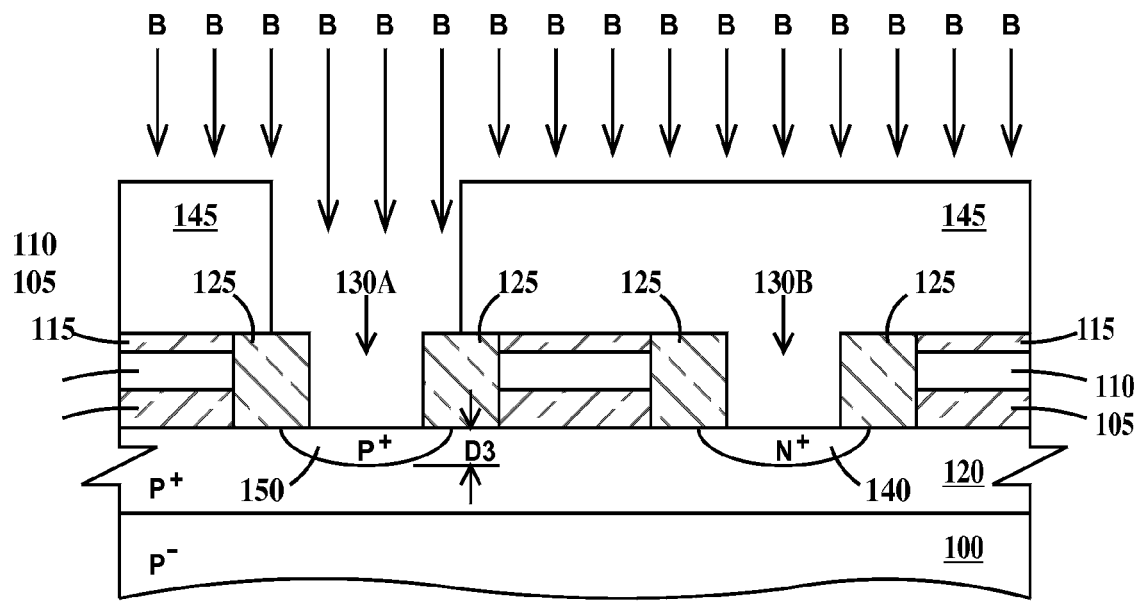

In FIG. 1F a patterned photoresist layer 145 is formed, protecting trench 130B and exposing trench 130A. Then a P-type ion implantation is performed to form a diffused contact region 150 in doped layer 120. Afterwards, patterned photoresist layer 145 is removed. Diffused contact region 150 extends a distance D3 into doped layer 120. Diffused contact region 150 does not extend through doped layer 120 into silicon substrate 100. In one example, the P-type ion implantation implants a boron (B) species to a concentration of between about 5E19 atm/cm$^3$ and about 5E20 atm/cm$^3$. In one example, D3 is between about 0.2 microns and about 0.5 microns.

Figure 1G:
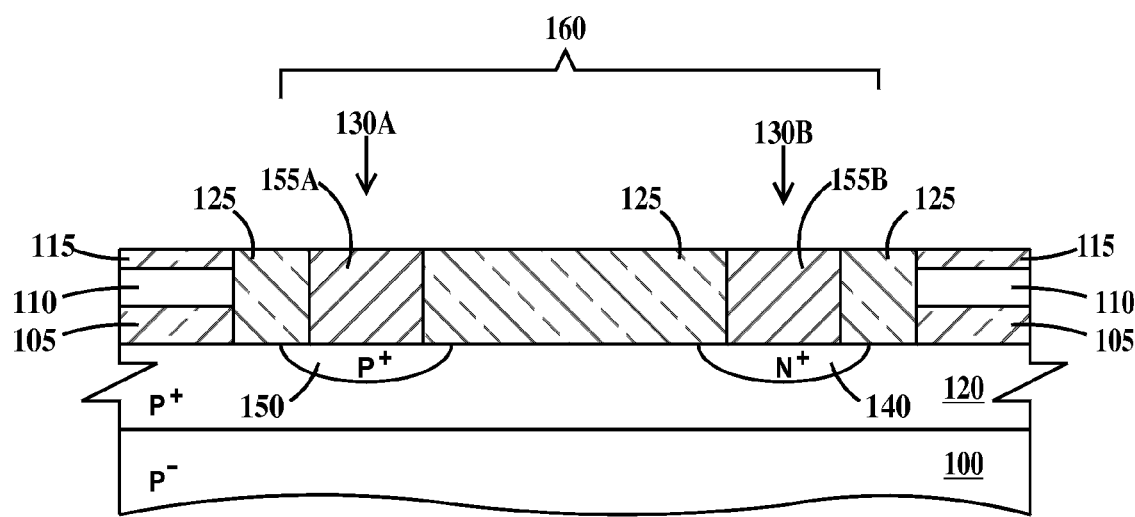

In FIG. 1G, trenches 130A and 130B are filled with an electrical conductor to form respective contacts 155A and 155B. In one example, contacts 155A and 155B comprise polysilicon, tungsten, copper, aluminum, titanium, tantalum, titanium nitride, tantalum nitride or combinations thereof. A diode 160 has thus been formed comprising cathode region 140 and doped layer 120, the anode of the diode comprising doped layer 120. When used as an ionizing radiation detector, as described infra, the depletion region around cathode region 140 will act as a charge collection region when struck by ionizing radiation. Ionizing radiation particles striking the device generate electron-hole pairs. The electrons from the electron-hole pairs are then accelerated by the built-in electric field in the depletion layer around cathode region 140 and collected by cathode region 140.

Figure 2A:
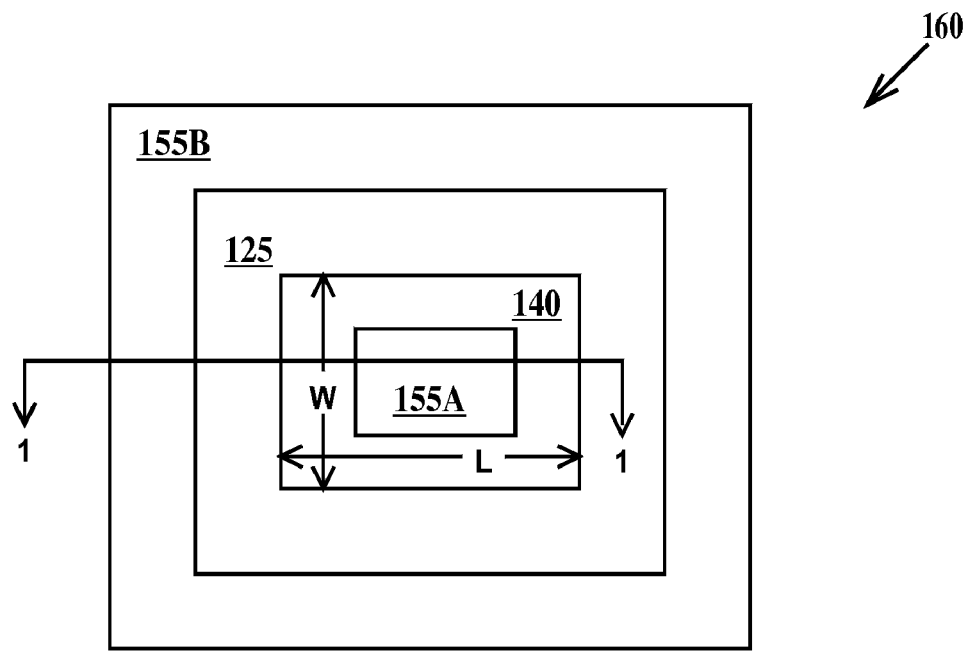
FIG. 2A is a top view illustrating the section through which FIGS. 1A through 1G were taken.

FIG. 2A is a top view illustrating the section through which FIGS. 1A through 1G were taken. In FIG. 2A, cathode region 140 is electrically contacted by contact 155A and doped region 120 (not shown) is electrically contacted by contact 155B. Contacts 155A and 155B are electrically isolated by trench isolation 125. Cathode region 140 has a width W and a length L or an area A=W*L.

The probability of detecting ionizing radiation is a function of the area of the depletion region around cathode 140, which is approximately equal to the area A of cathode region 140. The larger the collection region area, the more charge can be collected for a given depletion layer capacitance per unit area. By fabricating diodes of different cathode area, detectors of different sensitivity to charge can be formed.

Figure 2B:
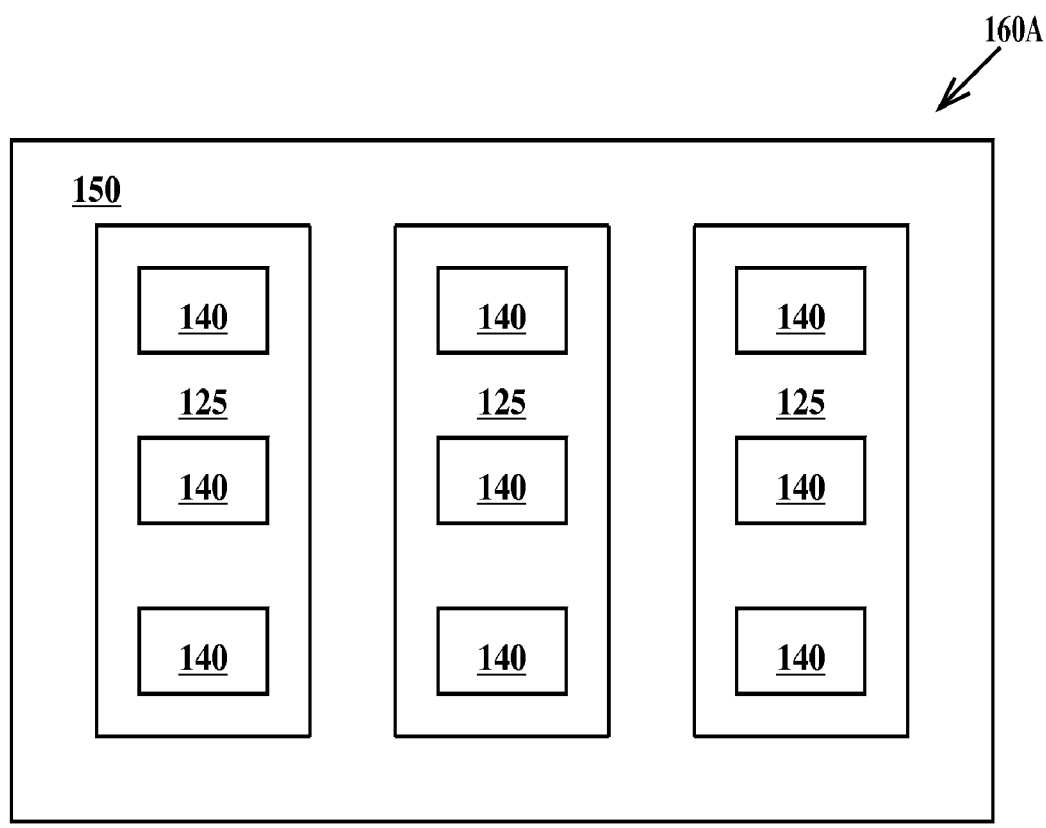
FIG. 2B is a top view of an exemplary ionizing radiation detection device according to embodiments of the present invention.

FIG. 2B is a top view of an exemplary ionizing radiation detection device according to embodiments of the present invention. In FIG. 2B, a diode 160A includes multiple cathodes that may be electrically connected in parallel to form a larger diode. By fabricating arrays of different numbers of same area cathodes, detectors of different sensitivity to charge can be formed.

Figure 3:
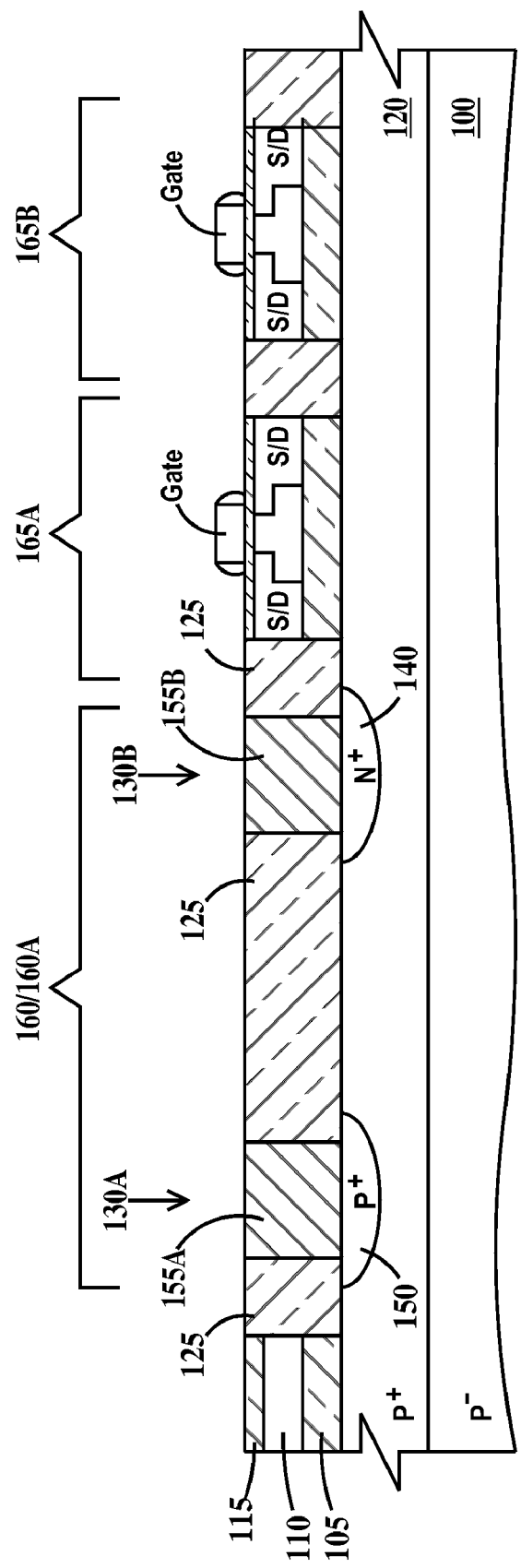
FIG. 3 is a cross-section of an integrated circuit including an ionizing radiation detection device according to embodiments of the present invention and field effect transistors.

FIG. 3 is a cross-section of an integrated circuit including an ionizing radiation detection device according to embodiments of the present invention and field effect transistors. In FIG. 3, field effect transistor (FETs) 165A and 165B including source/drains (S/D) and gates are formed in/on regions of single-crystal silicon layer 110. These and other devices such as resistors, capacitors, inductors and diodes may be used to form operational circuits of a variety of integrated circuit (IC) chips as well as detection circuits to be connected to diode 160/160A and to control circuits for controlling operation and operating parameters of the IC chip. Alternatively, diodes 160/160A, the ionizing radiation event detection circuits and the control circuits may be on a separate IC chip from the operational circuits. Alternatively, diodes 160/160A and the ionizing radiation event detection circuits may be on a first IC chip and the control circuits and the operational circuits on a second IC chip.

Figure 4:
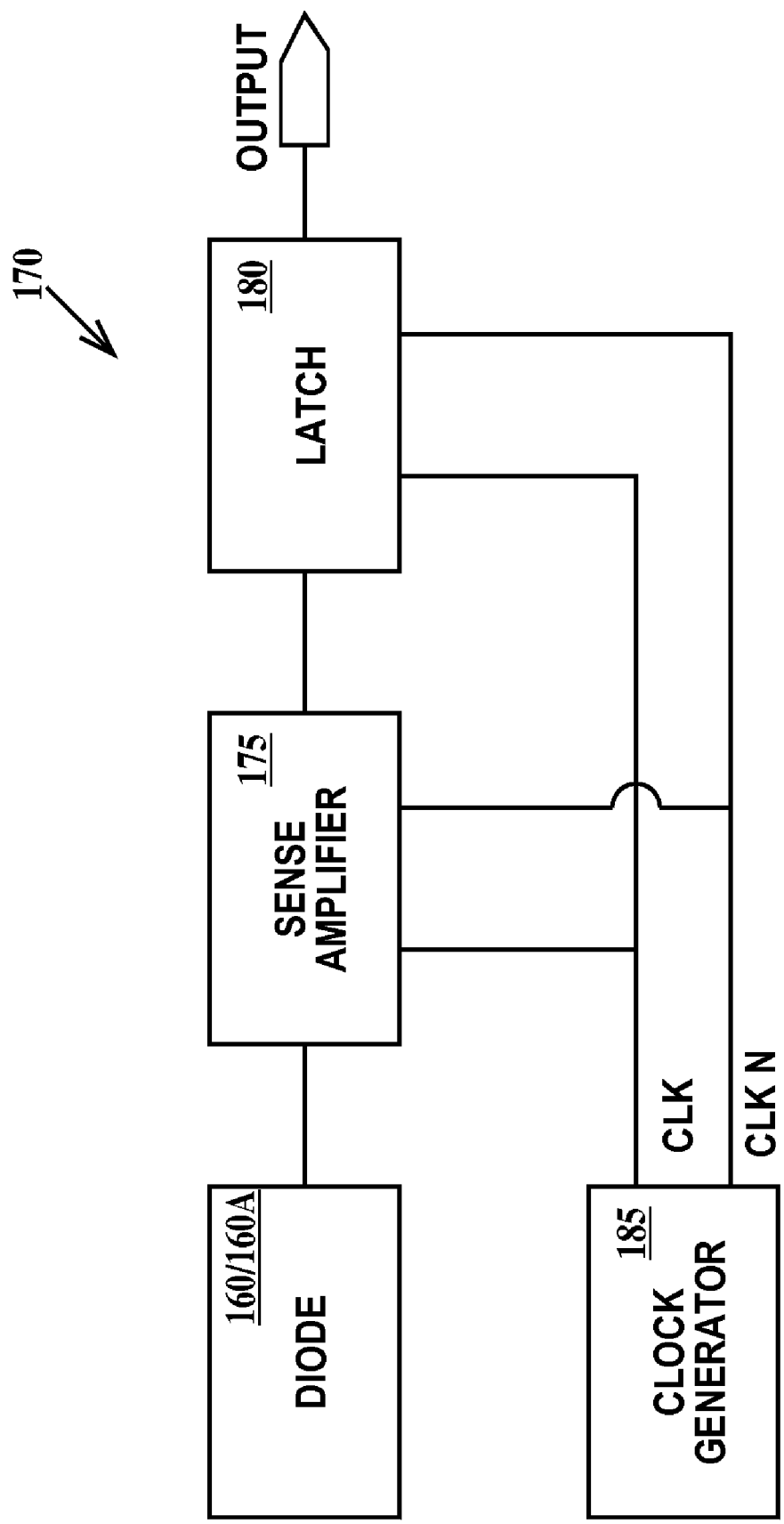
FIG. 4 is a block circuit diagram of an exemplary ionizing radiation detection circuit utilizing an ionizing radiation detection device according to embodiments of the present invention.

FIG. 4 is a block circuit diagram of an exemplary ionizing radiation detection circuit utilizing an ionizing radiation detection device according to embodiments of the present invention. In FIG. 4, an ionizing radiation detection clocked logic circuit 170 includes a diode 160/160A, a sense amplifier 175, a latch 180 and a clock generator 185 generating a CLK and a CLK N (inverse CLK) signal. The diode is coupled to sense amplifier 175 and an output of the sense amplifier 175 is connected to an input of latch 180. The CLK signal is coupled to sense amplifier 175 and latch 180. The CLK N signal is also coupled to sense amplifier 175 and latch 180.

Figure 5:
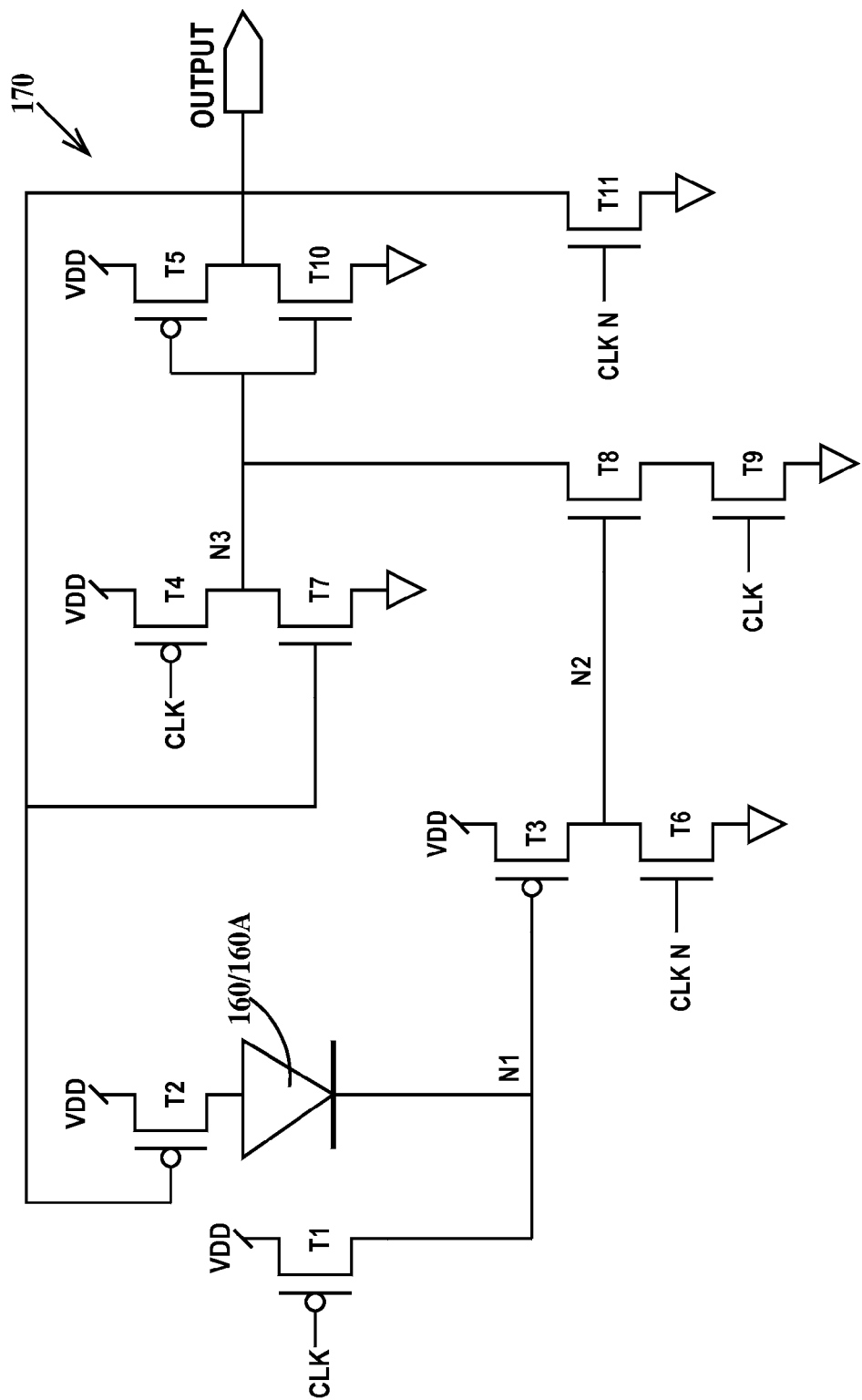
FIG. 5 is a detailed circuit diagram of an exemplary ionizing radiation detection circuit utilizing an ionizing radiation detection device according to embodiments of the present invention.

FIG. 5 is a detailed circuit diagram of an exemplary ionizing radiation detection circuit utilizing an ionizing radiation detection device according to embodiments of the present invention. In FIG. 5, an ionizing radiation detection domino logic circuit 170 includes diode 160/160A, PFETs T1, T2, T3, T4 and T5 and NFETs T6, T7, T8, T9, T10 and T11. A domino logic circuit is a type of clocked logic circuit. The cathode of diode 160/160A is connected to the drain of PFET T2 and the anode of diode 160/160A is connected to drain of PFET T1 and the gate of PFET T3 (a node N1). The drain of PFET T3 is connected to the drain of NFET T6 and the gate of NFET T8 (a node N2). The source of NFET T8 is connected to the drain of NFET T9. The gate of PFET T2 is connected the gate of NFET T7 and the drains of PFET T5 and NFETS T10 and T11 and to the OUTPUT pin of circuit 170. The drains of PFET T4 and NFET T7 are connected to the drain of NFET T8 and the gates of PFET T5 and NFET T10 (a node N3). The sources of PFETS T1, T2, T3, T4 and T5 are connected to VDD. The sources of NFETs T6, T9 and T11 are connected to ground. The CLK signal is connected to the gates of PFET T1 and T4 and NFET T9. The CLK N signal is connected to the gates of NFETS T6 and T11.

As stated supra, the depletion region around the cathode region of diode 160/160A will act as a charge collection region when struck by ionizing radiation. Ionizing radiation particles striking the depletion region generate electron-hole pairs. The electrons are then collected by cathode region of the diode and when sufficient charge is collected, the voltage on node N1 drops if the CLK signal is high.

Figure 6:
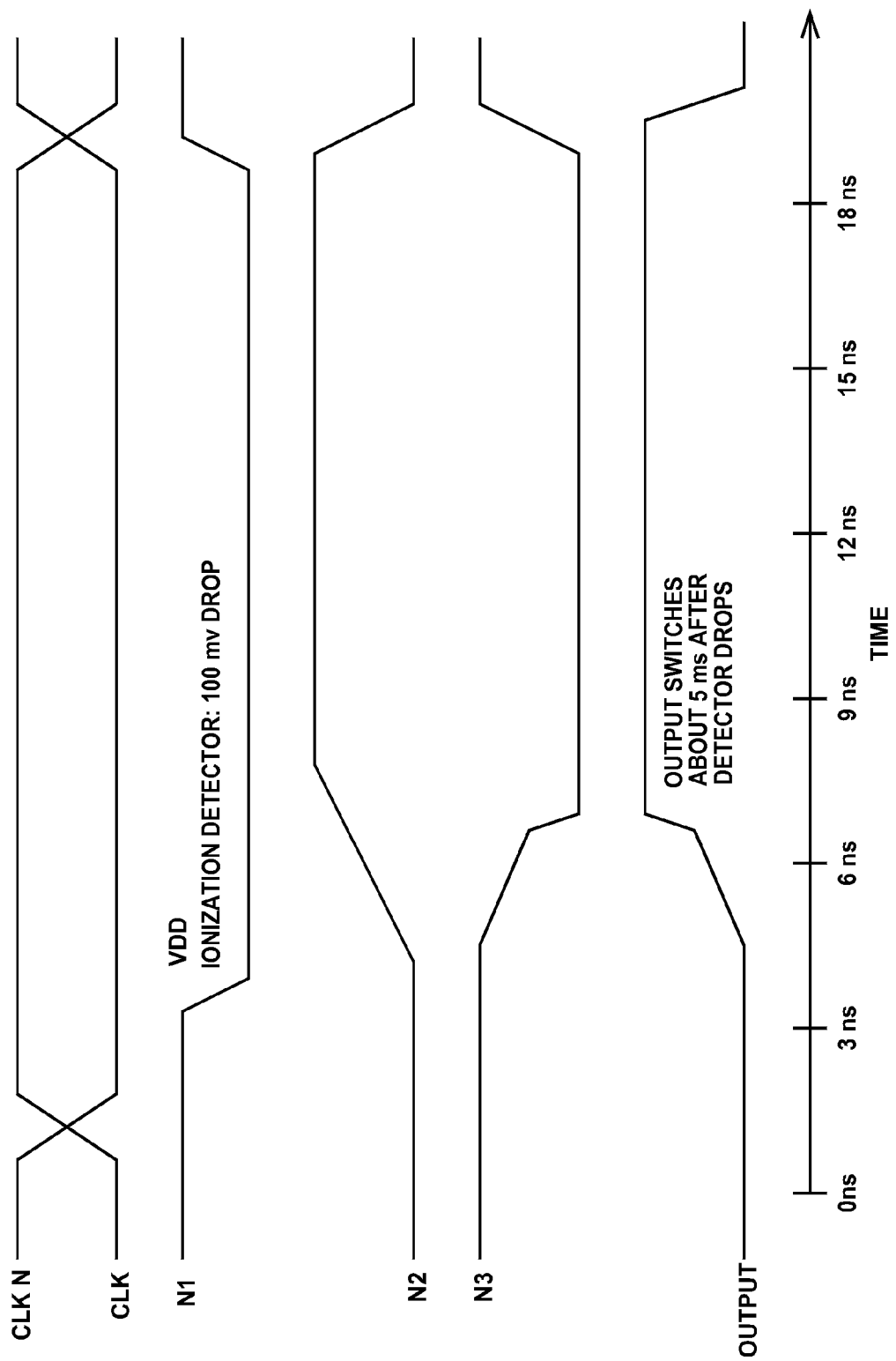
FIG. 6 is a timing diagram of the circuit of FIG. 6.

FIG. 6 is a timing diagram of the circuit of FIG. 5. The timing diagram of FIG. 6 is exemplary and is based on a particular domino logic circuit and diode design. The normal state of node N3 of domino logic circuit 170 (see FIG. 5) is precharged high. After an ionizing radiation event and with CLK high (CLK N low), node N1 drops by a fixed amount (for example 100 milli-volts), node N2 goes high, node N3 goes low (discharges) and the OUTPUT goes high after a small delay after the voltage on node N1 drops. After the next CLK/CLK N transition, VDD returns to normal, node N1 goes high, node N2 goes low, node N3 goes high (recharges) and the OUTPUT goes low to reset the circuit.

In one example, diode 160/160A is designed to operate at a VDD between about 0.9 volts to about 1.3 volts, have a junction breakdown voltage of about 11 volts, a junction depth, Xm of between about 0.2 microns and about 0.5 microns, an Nd between about 5E19 and about 5E20, a Na between about 5E16 and about 5E17 and a junction capacitance (CJ) of between about 1 femto-farad and 3 femto-farads per square micron.

The well know equation, Q (charge)=C (capacitance)*V (voltage) may be used to determine the area of the diodes. In a first example, a first diode with a total cathode area of 35 square microns fabricated to the parameters supra in a domino logic circuit capable of detecting a drop of 100 milli-volt across the first diode (when CJ=2 femto-farads/cm$^2$) when the diode collects Q=7 femto-coulombs. This is a sensitivity of one ionizing radiation event per fluence of 1.4E10 protons/cm$^2$ for 50 MeV protons.

In second example, a second diode with a total cathode area of 100 square microns fabricated to the parameters supra, in a domino logic circuit capable of detecting a drop of 100 milli-volt across the second diode (when CJ=2 femto-farads/cm2) when the diode collects Q=20 femto-coulombs. This is a sensitivity of one ionizing radiation event per fluence of 2E9 protons/cm$^2$ for 750 MeV protons.

In third example, a third diode with a total cathode area of 50 square microns fabricated to the parameters supra, in a domino logic circuit capable of detecting a drop of 100 milli-volt across the second diode (when CJ=2 femto-farads/cm2) when the diode collects Q=10 femto-coulombs. This is a sensitivity of one ionizing radiation event per fluence of 5.5E9 protons/cm$^2$ for 150 MeV protons.

Figure 7:
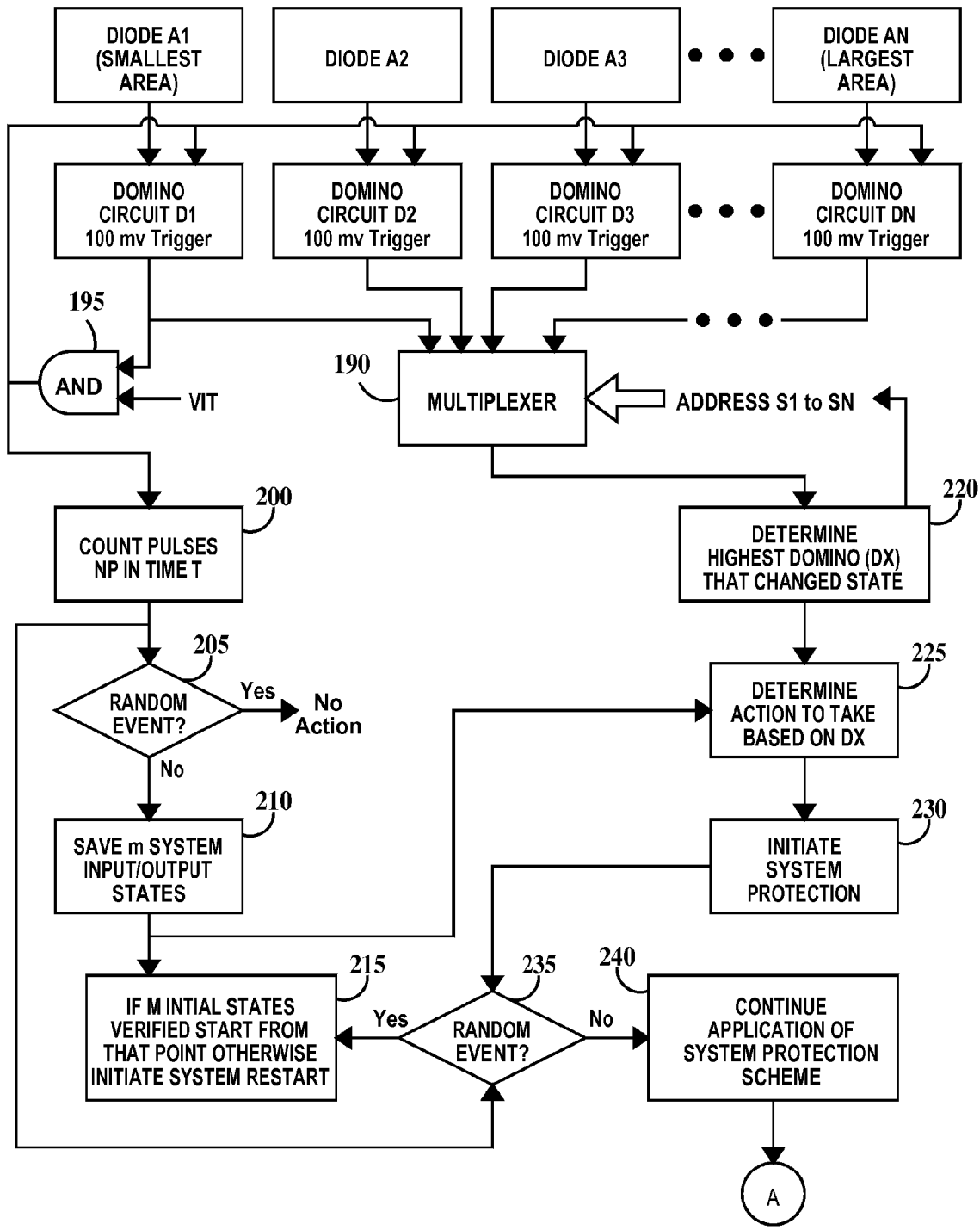
FIGS. 7 and 8 are a system diagram of an integrated circuit chip having an ionizing radiation detection circuit utilizing an ionizing radiation detection device according to embodiments of the present invention.
Figure 8:
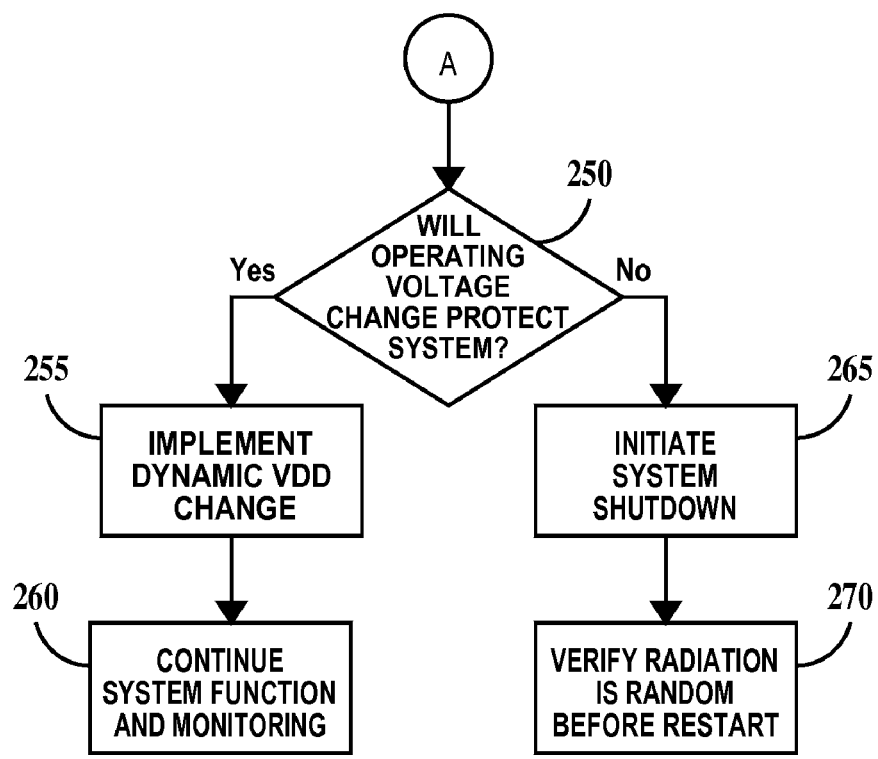

FIGS. 7 and 8 are a system diagram of an integrated circuit chip having an ionizing radiation detection circuit utilizing an ionizing radiation detection device according to embodiments of the present invention. In FIG. 7, an array of domino logic circuits D1 through DN contain corresponding diodes A1 through AN. Diode A1 having the smallest collection area, diode A2 having the second smallest collection area, diode A3 having the third smallest collection area, progressing to diode AN having the largest collection area. Other than the size of the diodes, all domino logic circuits are designed to be identical. The output of each domino logic circuit A1 though AN is connected to a different input of a multiplexer 190. Multiplexer 190 is addressable by address control signals S1 through SN corresponding to respective domino logic circuits D1 through DN. The output of domino logic circuit D1 is also connected to a first input of AND gate 195 and a reference signal VIT is connected to a second input of AND gate 195. The output of AND gate 195 generates a reset of domino circuits D1 through DN. The reset may be accomplished by forcing CLK low and CLK N high (see FIG. 5). An ionizing radiation event (greater than the minimum detectable by domino logic circuit D1) occurring to the set of domino logic circuits D1 through DN will trigger at least domino logic circuit D1. An ionizing radiation event greater than the minimum detectable by domino logic circuit D1 occurring to the set of domino logic circuits D1 through DN will trigger two or more domino logic circuits up to all of the domino logic circuits depending upon the intensity of the ionizing radiation. The smaller the difference in the collection areas of diodes A1 through AN, the greater the discrimination between events of different ionizing radiation intensity.

Alternatively, domino logic circuits D1 through D4 may be replaced with other types of circuits capable of detecting a drop in voltage across the corresponding diodes A1 through AN. Examples of alternative detection circuits include, but are not limited to SRAM circuits.

The processes indicated in operations 200 through 240 of FIG. 7 and 250 through 270 of FIG. 8 may be performed by hardwired circuits performing operations 200 through 270 or by a microprocessor running a software program embodying method steps performing operations 200 through 270, with appropriate interfaces to the signals from the output and address inputs of multiplexer 190 and the output of AND gate 195.

Operations 200 through 215 monitor the occurrence of any non-random ionizing radiation event. Operations 220 through 240 monitor the intensity of any ionizing radiation event.

Continuing with FIG. 7, in operation 200 the number of pulses (NP) received from AND gate 195 in a time T are counted. AND gate 195 generates a pulse when the output of domino logic circuit D1 and signal VIT are both high. The pulse count NP is an input to operations 205 and 235. In operation 205 it is determined if NP represents a random event based on predetermined rules. An example of such a rule is: is NP greater than X when T is equal to Y. If, in operation 205 it is determined that NP represents a random event, no action is required. However, if in operation 205 it is determined that NP represents a non-random event, then in operation 210 "m" system input/output states are saved. Next operation 215 is performed. In the present context, system states are defined to be input and output states if an IC being monitored for ionizing radiation events or the input/output states of multiple ICs interconnected into a system or electronic device. In operation 215, the present input/output states of the system are compared to saved states and if they verify (are the same) a warm system restart is performed, otherwise a cold system restart is performed. The difference between a warm restart and a cold restart is the value of the "m" input parameters. A warm restart uses saved values; a cold restart uses initialization values.

Simultaneously with operations 200 through 215, operations 220 through 240 are performed. In operation 220 the highest order domino logic circuit DX (from D1 being lowest to DN being the highest possible) to change state is determined by polling (addressing) multiplexer 190. Next in operation 225, the action to be taken is determined based on the value of DX. The significance of the value of DX is it is an indication of the amount of energy released by the ionizing radiation event and the appropriate action will vary based on the amount of energy (flux times ionizing radiation energy) released by the ionizing radiation event. Examples of actions to be taken include but are not limited to a temporary shutdown and warm restart, changing power supply voltages levels for specific circuits, changing well potentials for the FETs making up the system, and performing a shutdown and cold startup. Next operation 235 is performed. In operation 235 it is determined if NP represents a random event based on predetermined rules. An example of such a rule is: is NP greater than X when T is equal to Y. If, in operation 235 it is determined that NP represents a non-random event, then operation 240 is performed. However, if in operation 235 it is determined that NP represents a random event, then operation 215 is performed. Performance of operation 215 may or may not terminate the actions initiated in step 230. In operation 240, the protection scheme started in operation 240 is continued and operation 250 of FIG. 8 is performed.

In operation 250, it is determined if a change on operating voltage (VDD) will protect the system, even if the ionizing radiation event is ongoing at the present or lower intensity level. The determination is based on rules. An example of a rule is, if DX=X then a VDD change of Y may be implemented, but if DX=Z, then no VDD change can be implemented. If, in operation 250 it is determined that a change in operating voltage will protect the system, then in operation 255 a dynamic change to VDD is made and in operation 260, ionizing radiation event monitoring is continued (operations 200 and 220). If, in operation 250 it is determined that a change in operating voltage will not protect the system, then in operation 265 the system is shutdown and in operation 270 it is determined (by patching into operations 200 and 205) that any ionizing radiation events are random before a restart which may be warm or cold by patching into operation 215.

Figure 9:
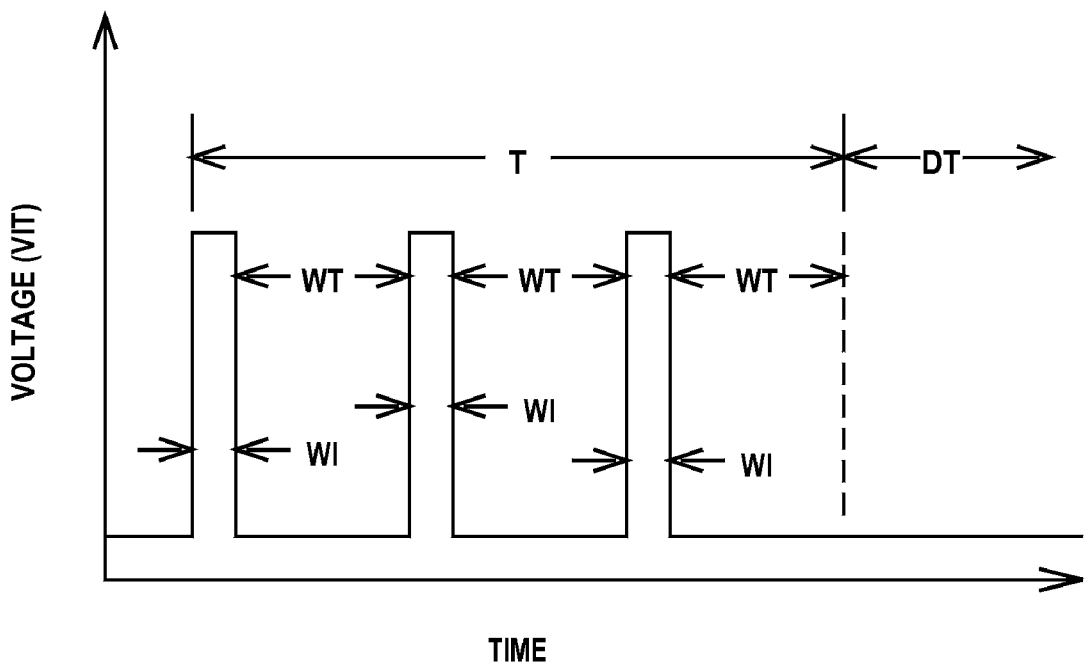
FIG. 9 is a timing diagram of a reference signal used by the system illustrated in FIGS. 7 and 8.

FIG. 9 is a timing diagram of a reference signal used by the system illustrated in FIGS. 7 and 8. In FIG. 9, signal VIT has a regular period made up of a high pulse width having a time duration WI and a low pulse separation having a time duration WT. WI is selected to be long enough to produce a reset of domino logic circuit D1 (see FIG. 7) WT is selected based on such things as the speed of error correction circuits of the system, propagation delays through circuits of the system and a projected minimum time between sequential ionizing radiation events. Time duration T is set to be an integer multiple of WI+WT (in the present example T=3*(WT+WI). After a time period DT, VIT is reasserted for another time duration T.

Thus the present invention provides a structure, system and methodology for monitoring ionizing radiation events in integrated circuits fabricated on SOI substrates The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A method of monitoring ionizing radiation, comprising:
collecting an ionizing radiation induced charge collected by a depletion region of a diode formed in a silicon layer below an oxide layer buried below a surface of a silicon substrate; and
coupling a cathode of said diode to a precharged node of a clocked logic circuit such that said ionizing radiation induced charge collected by said depletion region of said diode will discharge said precharged node and change an output state of said clocked logic circuit.

2. The method of claim 1, wherein said clocked logic circuit is a domino logic circuit.

3. The method of claim 1, further including:
monitoring said output state of said clocked logic circuit; and
in response to a change of said output state, initiating an action to prevent failure of an integrated circuit including field effect transistors whose source/drains are formed in a silicon layer between said top surface of said silicon substrate and a top surface of said buried oxide layer.

4. The method of claim 3, wherein said action is selected from the group consisting of (1) shutting down, initializing and restarting said integrated circuit, (2) saving input and output states of said integrated circuit, shutting down said integrated circuit, restarting said integrated circuit and restoring said input and output states, and (3) changing an operating voltage level of a power supply supplying power to said integrated circuit.

5. The method of claim 3, further including:
determining, based on sampling of said output state over a predetermined period of time, if said change in said output state is a random event.

* * * * *